United States Patent [19]

Yamaguchi et al.

[11] Patent Number: 4,579,778

[45] Date of Patent: Apr. 1, 1986

[54] MAGNETIC RECORDING MEDIUM

[75] Inventors: Nobutaka Yamaguchi; Norio Nasu; Eiichi Tadokoro; Masaaki Fujiyama, all of Kanagawa, Japan

[73] Assignee: Fuji Photo Film Co., Ltd., Kanagawa, Japan

[21] Appl. No.: 603,851

[22] Filed: Apr. 25, 1984

[30] Foreign Application Priority Data

Apr. 25, 1983 [JP] Japan ................. 58-73342

[51] Int. Cl.$^4$ ................................. G11B 5/72
[52] U.S. Cl. ..................... 428/336; 360/138; 360/135; 360/136; 427/128; 427/131; 427/132; 428/457; 428/480; 428/694; 428/695; 428/900
[58] Field of Search ............... 428/694, 695, 480, 900, 428/458, 336; 427/128, 131, 132; 360/134–136

[56] References Cited

U.S. PATENT DOCUMENTS

| | | | |
|---|---|---|---|
| 3,501,344 | 3/1970 | Watson | 428/694 |
| 4,112,187 | 9/1978 | Asakura | 428/694 |
| 4,135,016 | 1/1979 | Ogawa | 428/337 |
| 4,316,927 | 2/1982 | Kimura | 428/694 |
| 4,318,957 | 3/1982 | Videc | 428/694 |
| 4,388,360 | 6/1983 | Miyoshi | 428/694 |
| 4,427,738 | 1/1984 | Fujiyama | 428/694 |
| 4,442,171 | 4/1984 | Sato | 428/694 |
| 4,452,863 | 6/1984 | Takizawa | 428/695 |
| 4,497,865 | 2/1985 | Minami | 428/336 |

FOREIGN PATENT DOCUMENTS 0094522  7/1981  Japan ................. 428/694

Primary Examiner—Ellis P. Robinson
Attorney, Agent, or Firm—Sughrue, Mion, Zinn, Macpeak & Seas

[57] ABSTRACT

A magnetic recording medium is disclosed which comprises a non-magnetic support, having a Young's modulus of $7 \times 10^{10}$ to $1 \times 10^{13}$ dyn/cm$^2$, having coated on opposite surfaces, a magnetic recording layer comprising ferromagnetic particles and a fatty acid ester and a backing layer comprising a cellulose resin.

17 Claims, No Drawings

MAGNETIC RECORDING MEDIUM

BACKGROUND OF THE INVENTION

The present invention relates to a magnetic recording medium, and more particularly to a magnetic recording medium having improved durability.

It is known that an abrasive such as chromium oxide ($Cr_2O_3$) and a lubricant such as a fatty acid ester are incorporated into a magnetic recording layer to improve durability, particularly the still life of a magnetic recording layer as described in U.S. Pat. No. 3,630,910. A fatty acid ester is advantageously used, since an abrasive wears out a magnetic head, as the amount of the abrasive increases. However, even if a fatty acid is used, the magnetic recording medium readily deforms and cannot maintain good contact with the magnetic head after the magnetic recording medium is repeatedly used on a video tape recorder more than several hundred times. Accordingly, a satisfactory still life cannot be obtained.

SUMMARY OF THE INVENTION

An object of the present invention is to provide a magnetic recording medium having excellent durability.

Another object of the present invention is to provide a magnetic recording medium having excellent still life.

It have been found that the above objects can be attained by a magnetic recording medium comprising a non-magnetic support having a Young's modulus of not lower than $7 \times 10^{10}$ dyn/cm$^2$ having provided on opposite surfaces a magnetic recording layer comprising ferromagnetic particles and a fatty acid ester, and a backing layer comprising a cellulose resin.

DETAILED DESCRIPTION OF THE INVENTION

Fatty acid esters which can be used in this invention include those that are commonly used as lubricants for a magnetic recording layer, such as oleyl oleate, amyl myristate, butyl stearate, ethyl stearate, amyl stearate, propyl stearate, ethyl behenate, methyl caprinate, butyl laurate or a mixture thereof as described in U.S. Pat. No. 4,135,016. Of these, butyl stearate and amyl stearate are preferred. The amount of the fatty acid ester to be used is 0.01 to 10, preferably 0.1 to 5, parts by weight based on 100 parts by weight of ferro-magnetic particles.

The cellulose resin used in this invention includes cellulose derivatives such as cellulose acetate butyrate, cellulose acetate propionate, nitrocellulose or a mixture thereof as described in U.S. Pat. No. 4,135,016. Of these, nitrocellulose is preferred. The amount of the cellulose resin to be used can be varied depending upon the thickness of the backing layer. Usually, the cellulose resin can be used in an amount of 5 to 100% by weight, preferably 7 to 50% by weight and more preferably 10 to 25% by weight based on the total weight of the binder. Generally, the backing layer has a thickness of 0.05 to 5 μm, preferably 0.1 to 3 μm and more preferably 0.5 to 2 μm.

The non-magnetic support used in this invention should have a Young's modulus of $7 \times 10^{10}$ to $1 \times 10^{13}$ dyn/cm$^2$ and more preferably $8 \times 10^{10}$ to $8 \times 10^{11}$. The Young's modulus referred to herein relates to that of the support being $7 \times 10^{10}$ to $1 \times 10^{13}$ dyn/cm$^2$ and preferably $8 \times 10^{10}$ to $8 \times 10^{11}$ dyn/cm$^2$ at least in the machine direction and preferably in the transverse direction as well. Materials for the support include those which are commonly known as a support for a magnetic recording medium such as polyethylene terephthalate, polyethylene naphthalate, polyamide, polyimide or triacetyl cellulose as described in U.S. Pat. No. 4,135,016. Of these, polyethylene terephthalate, polyamide and polyimide are preferred. A thin film of non-magnetic metals such as aluminum, copper, nickel or zinc can be provided on the above-mentioned plastic film by a vapor deposition method, if desired.

The possible compositions of the magnetic recording layer, i.e. the ferromagnetic particles, binders or additives (e.g., organic solvents, antistatic agents, inorganic pigments, organic powders, surfactants, abrasives, lubricants, etc.) employed therein, and the method for preparing a magnetic recording medium are disclosed in U.S. Pat. No. 4,135,016.

Binders other than a cellulose resin, which can be the same binders as those of the magnetic recording layer, organic solvents which can be the same as those in the magnetic recording layer, antistatic agents (e.g., carbon black, graphite), inorganic pigments (e.g., magnesium silicate, calcium carbonate, aluminum silicate, barium sulfate, clay), organic particles (e.g., benzoguanamine resin, polyethylene terephthalate), surfactants which can be the same as those in a magnetic recording layer, abrasives and lubricants which can be the same as those in a magnetic recording layer can be added into the backing layer. The method for preparing and coating a backing layer is the same as that for a magnetic recording layer.

The present invention will be explained in more detail by the following non-limiting examples. In the examples, parts means parts by weight.

EXAMPLE 1

| | |
|---|---|
| Co-added γ-$Fe_2O_3$ (particle size 0.35μ, acicular ratio 1:8, Coercive force 650 Oe) | 300 parts |
| Amyl stearate | 6 parts |
| Copolymer of vinyl chloride and vinyl acetate (87:13) (polymerization degree 420) | 30 parts |
| Polyester polyurethane (synthesized from butylene adipate and 4,4'-diphenyl methane diisocyanate, styrene equivalent molecular weight about 130,000) | 30 parts |
| $Cr_2O_3$ | 12 parts |
| Butyl acetate | 600 parts |

The above composition was dispersed in a ball mill for 48 hours. To the dispersion, 40 parts of Desmodur L-75 (30 parts by solid content: 75% ethyl acetate solution of an adduct product of 1 mole of trimethylol propane and 3 moles of toluylene diisocyanate) were added. After 30 minutes, the dispersion was filtrated by a filter having an average pore diameter of 1μ to prepare a magnetic coating composition.

The magnetic coating composition thus prepared was coated by a doctor coating method on a polyethylene terephthalate film having a thickness of 14μ (Young's modulus of $8 \times 10^{10}$ dyn/cm$^2$ in the machine direction of the film) which was provided with a backing layer having the following composition. The film was subjected to magnetic orientation in the machine direction and calendering treatment and was slit to a width of ½ inch to obtain a video tape for VHS (Sample No. 1)

| | |
|---|---|
| Nitrocellulose (H ½) | 400 parts |
| Desmodur L-75 | 133 parts |
| Carbon black ("furnace black", average particle size 60 mμ) | 300 parts |
| Methyl ethyl ketone | 2000 parts |
| Methyl isobutyl ketone | 2000 parts |

The above composition without the curing agent ("Desmodur L-75") was dispersed in a ball mill for 90 hours and the curing agent ("Desmodur L-75") was added thereto. After adjusting the viscosity thereof, the dispersion was filtrated by a filter having a pore size of $5\mu$ to prepare a coating composition of the backing layer, which was coated. The thickness of the magnetic recording layer was $5\mu$ and that of the backing layer was $1.5\mu$.

COMPARATIVE EXAMPLE 1

The same procedure as in Example 1 was repeated except that the following coating composition was used to prepare Samples Nos. 2 to 5.

Sample No. 2 was prepared without a fatty acid ester in the magnetic recording layer.

Sample No. 3 was prepared using liquid paraffin instead of a fatty acid ester.

Sample No. 4 was prepared additionally using "Desmodur L-75" in the same amount of the cellulose resin in the backing layer instead of the cellulose resin.

Sample No. 5 was prepared using a copolymer of vinyl chloride and vinyl acetate in the magnetic recording layer instead of the cellulose resin.

COMPARATIVE EXAMPLE 2

The same procedure as in Example 1 was repeated except that a polyethylene terephthalate support having a Young's modulus of $5\times10^{10}$ dyn/cm$^2$ was used to prepare a Sample No. 6.

EXAMPLE 2

The same procedure as in Example 1 was repeated except that a polyethylene terephthalate support having a Young's modulus of $7\times10^{10}$ dyn/cm$^2$ was used to prepare a Sample No. 7.

EXAMPLE 3

The same procedure as in Example 1 was repeated except that a polyethylene terephthalate support having Young's modulus of $5\times10^{10}$ dyn/cm$^2$ which was vapor deposited with aluminum to have a Young's modulus of $10\times10^{10}$ dyn/cm$^2$ in the machine direction was used to prepare a Sample No. 8.

EXAMPLE 4

The same procedure as in Example 1 was repeated except that 3 parts of a fatty acid ester was reduced and 3 parts of a fatty acid (stearic acid) was added to prepare a Sample No. 9.

The resulting magnetic recording tapes were mounted on a VHS video cassette and were evaluated by the following manner.

The VTR for the VHS system was set on a still mode and the time for the recorded images of each sample to disappear was measured. The time of the samples which had not made a running (initial still life) and the time of the samples which had made 500 passes were measured. The results are shown in the Table.

TABLE

| Sample No. | Example or Comparative Example | Fatty acid ester in magnetic recording layer | Fatty acid in magnetic recording layer | Cellulose resin in backing layer | Young's modulus of support in the machine direction | Initial still life (minutes) | Still life after 500 passes (minutes) | Remarks |
|---|---|---|---|---|---|---|---|---|
| 1 | Example 1 | Amyl stearate | — | Nitrocellulose | $8\times10^{10}$ | 60 to 120 | 60 to 120 | |
| 2 | Comparative Example 1 | — | — | " | " | less than 3 | less than 3 | Tape largely deformed after running |
| 3 | Comparative Example 1 | (liquid paraffin) | — | " | " | 3 to less than 15 | less than 3 | after running |
| 4 | Comparative Example 1 | Amyl stearate | — | — | " | Sample could not be prepared. | | |
| 5 | Comparative Example 1 | Amyl stearate | — | (Vinyl chloride-vinyl acetate copolymer) | " | 60 to 120 | 3 to less than 15 | Tape deformed after running |
| 6 | Comparative Example 2 | Amyl stearate | — | Nitrocellulose | $5\times10^{10}$ | " | 3 to less than 15 | |
| 7 | Example 2 | Amyl stearate | — | " | $7\times10^{10}$ | " | 15 to less than 60 | |
| 8 | Example 3 | Amyl stearate | — | " | $10\times10^{10}$ | " | 60 to 120 | |
| 9 | Example 4 | Amyl stearate | Stearic acid | " | $7\times10^{10}$ | longer than 120 | longer than 120 | |

It is clear from the Table that the still life and tape deformation can be improved by invention wherein the following three conditions are met at the same time, that is, (1) a fatty acid ester is included in the magnetic recording layer, (2) a cellulose resin is included in the backing layer and (3) a support has a Young's modulus of $7\times10^{10}$ dyn/cm$^2$.

The composition for the backing layer in Sample No. 4 was filtrated with difficulty and the final tape sample could not be prepared.

As in the case of Sample No. 9, where a fatty acid (stearic acid) was used in addition to a fatty acid ester, the still life was excellent.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support, having a Young's modulus of $7\times10^{10}$ to $1\times10^{13}$ dyn/cm$^2$, having coated on opposite surfaces, a magnetic recording layer comprising ferromagnetic particles and a fatty acid ester and a backing layer comprising a cellulose resin, wherein said fatty acid ester is selected from the group consisting of butyl stearate and amyl stearate.

2. The magnetic recording medium as claimed in claim 1, wherein said non-magnetic support has a Young's modulus of $8\times10^{10}$ to $8\times10^{11}$ dyn/cm$^2$.

3. The magnetic recording medium as claimed in claim 1, wherein said non-magnetic support is comprised of a material selected from the group consisting of polyethylene terephthalate, polyethylene naphthalate, polyamide, polyimide, and triacetylcellulose.

4. The magnetic recording medium as claimed in claim 3, wherein said non-magnetic support is comprised of a material selected from the group consisting of polyethylene terephthalate, polyamide and polyimide.

5. The magnetic recording medium as claimed in claim 1, wherein said non-magnetic support has provided thereon a vapor-deposited layer of aluminum, copper, nickel or zinc.

6. The magnetic recording medium as claimed in claim 1, wherein said fatty acid ester is employed in an amount of from 0.01 to 10 parts by weight based on 100 parts by weight of the ferromagnetic particles.

7. The magnetic recording medium as claimed in claim 6, wherein said fatty acid ester is employed in an amount of from 0.1 to 5 parts by weight based on 100 parts by weight of the ferromagnetic particles.

8. The magnetic recording medium as claimed in claim 1, wherein said cellulose resin is selected from the group consisting of cellulose acetate butyrate, cellulose acetate propionate, nitrocellulose, and mixtures thereof.

9. The magnetic recording medium as claimed in claim 8, wherein said cellulose resin is nitrocellulose.

10. The magnetic recording medium as claimed in claim 1, wherein said cellulose resin is contained in an amount of 5 to 100% by weight based on the total weight of the binder.

11. The magnetic recording medium as claimed in claim 10, wherein said cellulose resin is contained in an amount of 7 to 50% by weight based on the total weight of the binder.

12. The magnetic recording medium as claimed in claim 11, wherein said cellulose resin is contained in an amount of 10 to 25% by weight based on the total weight of the binder.

13. The magnetic recording medium as claimed in claim 1, wherein said backing layer has a thickness of 0.05 to 5 µm.

14. The magnetic recording medium as claimed in claim 13, wherein said backing layer has a thickness of 0.1 to 3 µm.

15. The magnetic recording medium as claimed in claim 14, wherein said backing layer has a thickness of 0.5 to 2 µm.

16. The magnetic recording medium as claimed in claim 1, wherein said Young's modulus is that measured in the machine direction.

17. The magnetic recording medium as claimed in claim 1, wherein said Young's modulus is that measured in the machine direction and the transverse direction.

* * * * *